(12) United States Patent
Suzuki

(10) Patent No.: US 6,377,013 B2
(45) Date of Patent: Apr. 23, 2002

(54) CONTROL APPARATUS FOR LEGGED MOBILE ROBOT

(75) Inventor: Yoshio Suzuki, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/741,835

(22) Filed: Dec. 22, 2000

(30) Foreign Application Priority Data

Dec. 24, 1999 (JP) ............................................. 11-365977

(51) Int. Cl.⁷ .............................................. G05B 13/00
(52) U.S. Cl. ............................... 318/568.1; 318/568.11; 318/568.12; 700/245; 700/249
(58) Field of Search ....................... 318/568.11, 568.12, 318/568.13, 568.19, 568.1; 700/245, 249

(56) References Cited

U.S. PATENT DOCUMENTS

| | | | | |
|---|---|---|---|---|
| 4,990,839 A | * | 2/1991 | Schonlau | 318/568.1 |
| 5,214,749 A | * | 5/1993 | Brown | 394/95 |
| 5,428,713 A | * | 6/1995 | Matsumary | 395/80 |
| 5,692,186 A | * | 11/1997 | Fukuoka et al. | 395/617 |
| 5,978,593 A | * | 11/1999 | Sexton | 395/821 |

* cited by examiner

Primary Examiner—Paul Ip
Assistant Examiner—Rita Leykin
(74) Attorney, Agent, or Firm—Arent Fox Kintner Plotkin & Kahn, PLLC

(57) ABSTRACT

Each of motor local controllers for controlling operation of electric motors based on command data sent from a central controller has a memory 28 for storing a plurality of command data for a predetermined period. When the motor local controller fails to receive normal command data, a CPU of the motor local controller predicts new command data from the command data in the past stored in the memory, and controls operation of the electric motor based on the predicted new command data.

2 Claims, 5 Drawing Sheets

CONTROL APPARATUS FOR LEGGED MOBILE ROBOT

BACKGROUND OF THE INVENTION

1. Field of the Invention

The present invention relates to a control apparatus for controlling a legged mobile robot such as a biped walking robot or the like.

2. Description of the Related Art

Legged moving robots such as biped walking robots which have a plurality of joints, including hip, knee, and ankle joints, in their legs have one or more actuators such as electric motors or the like in the respective joints. The actuators are connected to a controller mounted in the torso of the robot and are directly controlled in a centralized fashion by the controller.

Of those robot joints, the joints, such as the hip joints, near the proximal ends of the legs need to be combined with a large number of signal lines which connect the actuators in the other joints, such as the knee and ankle joints, closer to the distal ends of the legs to the controller. It is rather difficult to neatly arrange those signal lines at the joints near the proximal ends of the legs. The actuators spaced relatively remotely from the controller, e.g., the actuators associated with the ankle joints, tend to malfunction due to noise introduced into the signal lines by which those actuators are connected to the controller.

To overcome the above drawbacks, the applicant of the present application has attempted to construct the following control system, i.e., the so-called distributed-processing control system:

Local controllers for controlling the operation of the respective actuators are positioned near the actuators, respectively, and connected to the respective actuators by signal lines. A central controller is mounted in the torso of the robot for sequentially generating command data to determine actions, specifically angular displacements or like, of the actuators corresponding to the local controllers. The central controller is connected to the local controllers by bus lines to transmit command data from the central controller to the local controllers. The local controllers receive the command data, and control actual actions of the actuators, e.g., energize the actuators, based on the command data.

According to the above distributed-processing control system, since the local controllers are positioned near the actuators, signal lines between the local controllers and the actuators can be arranged easily and protected against the entry of noise. Furthermore, because the local controllers control actual actions of the actuators, the number of communication lines between the local controllers and the central controller may be small, and hence those communication lines can be arranged easily.

In the distributed-processing control system, each of the local controllers controls the operation of the corresponding actuator based on command data successively supplied from the central controller. If a local controller fails to receive normal command data due to a disconnection of the communication line between the local controller and the central controller, then the local controller fails to operate the actuator normally.

Upon such a failure, the leg of the robot malfunctions, causing the robot to fall, damaging the robot itself or an object that is hit by the robot. Particularly, if the robot is a biped walking robot, then the robot is highly likely to fall down when an actuator on a leg thereof fails to operate normally.

SUMMARY OF THE INVENTION

It is therefore an object of the present invention to provide a control apparatus for controlling a legged moving robot which incorporates a distributed-processing control system, to prevent the robot from falling down as much as possible even when any of local controllers for controlling operation of actuators on the legs of the robot fails to receive normal command data from a central controller.

To achieve the above object, there is provided in accordance with the present invention an apparatus for controlling a legged mobile robot having a plurality of actuators including at least actuators for moving legs thereof, comprising a plurality of local controllers disposed near and connected to the actuators, respectively, for controlling operation of the actuators, and a central controller connected to the local controllers for sequentially generating command data for controlling the operation of the actuators controlled by the local controllers and sending the generated command data to the local controllers, each of the local controllers comprising memory means for storing the command data sent from the central controller to the each local controller for a predetermined period, and means for monitoring a reception status of the command data in the each local controller and, in the event of a reception failure of the command data, controlling operation of the actuator corresponding to the each local controller based on the command data for the predetermined period in the past which have been stored in the memory means.

The memory means of each of the local controllers stores the command data for the predetermined period. When the local controller fails to receive normal command data from the central controller, i.e., suffers a reception failure, due to a disconnection of communication lines between the local controllers and the central controller, the local controller can predict, to a certain extent, an action to be performed by the actuator based on the command data for the predetermined period in the past which have been stored in the memory means. Consequently, in the event of a reception failure of the command data, the local controller controls operation of the actuator based on the stored command data for the predetermined period in the past to prevent the actuator from abruptly changing its action. As a result, the danger of the legged mobile robot to fall down is minimized.

The apparatus for controlling the legged mobile robot particularly lends itself to controlling a biped walking robot.

Each of the local controllers may comprise means for, in the event of a reception failure of the command data, determining a function approximating a time-dependent change of the command data for the predetermined period in the past which have been stored in the memory means, generating new command data according to the determined function, and controlling operation of the actuator corresponding to the each local controller based on the new command data.

Accordingly, in the event of a reception failure of the command data, new command data can be generated so as to predict normal command data to be received, depending on a time-dependent change of the command data for the predetermined period in the past which have been stored in the memory means. Thus, the actuator is prevented from abruptly changing its action, and can appropriately be controlled for desired operation.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

Figure 1:
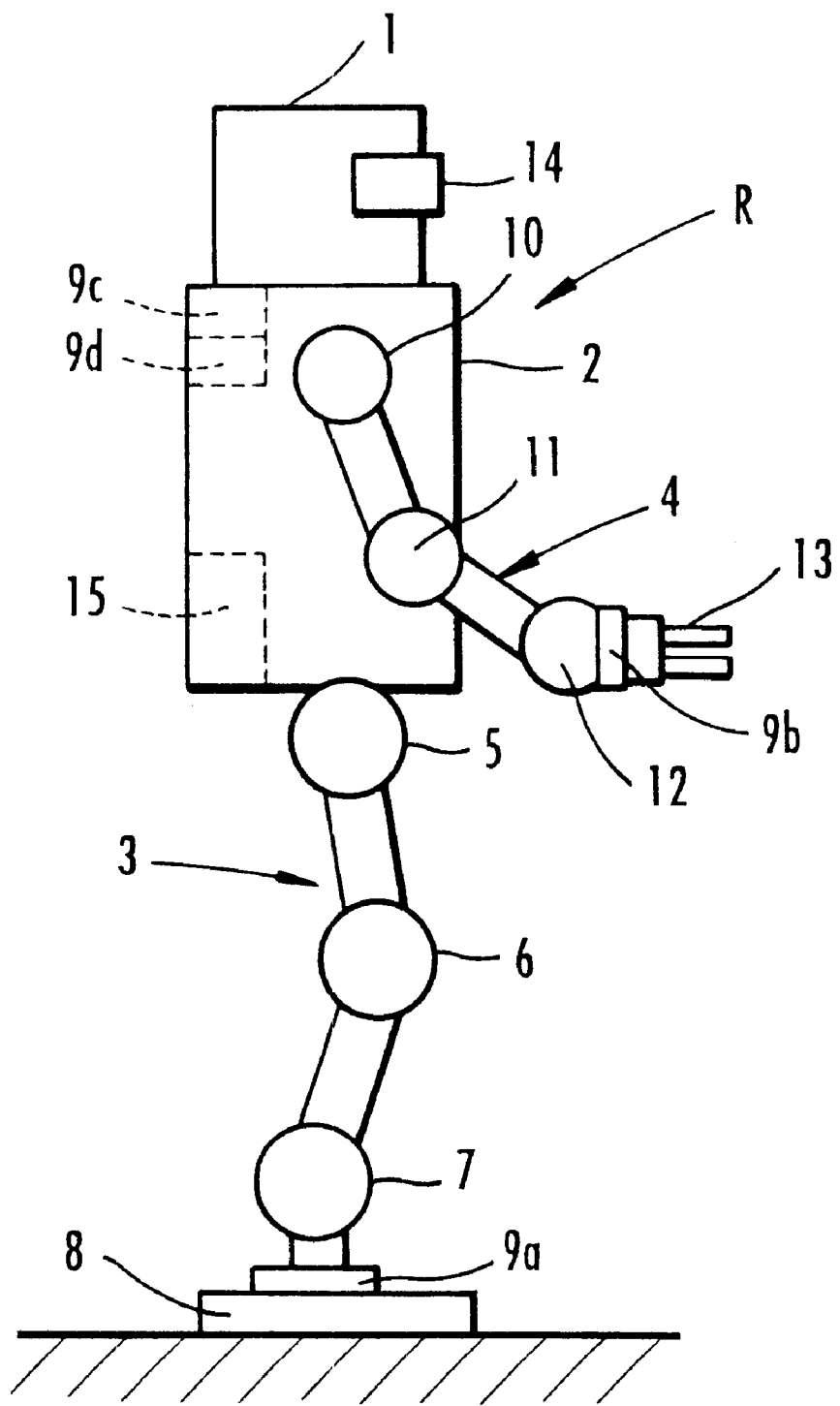
FIG. 1 is a side elevational view of a legged moving robot, i.e., a biped walking robot, according to the present invention.

As shown in FIG. 1, a legged moving robot R according to the present invention is a biped walking robot, and comprises a torso 2 with a head 1 mounted on an upper end thereof, a pair of legs 3 extending downwardly from a lower end of the torso 2, and a pair of arms 4 extending laterally from opposite sides of an upper portion of the torso 2.

The legs 3 are identical in structure to each other, and only one of the legs 3 is illustrated in FIG. 1. Similarly, the arms 4 are identical in structure to each other, and only one of the arms 4 is illustrated in FIG. 1.

Each of the legs 3 is coupled to the torso 3 by the hip joint 5, which is coupled successively through the knee joint 6 and the ankle joint 7 to a foot 8. Between the ankle joint 7 and the foot 8, there is interposed a 6-axis force sensor 9a for detecting an acting force, i.e., a translating force and a moment, that the foot 8 receives from the spot where the foot 8 touches the ground.

Similarly, each of the arms 4 is coupled to the torso 3 by a shoulder joint 10, which is coupled successively through an elbow joint 11, a wrist joint 12, and a 6-axis force sensor 9b to a hand 13.

Although not shown in FIG. 1, each of the joints 5–7 of each of the legs 3 and the joints 10–12 of each of the arms 4 comprises one or more electric motors, i.e., actuators. For example, the hip joint 5, the knee joint 6, and the ankle joint 7 of each of the legs 3 comprise three electric motors, one electric motor, and two electric motors, respectively, so that the hip joint 5, the knee joint 6, and the ankle joint 7 have three, one, and two degrees of freedom, respectively. The shoulder joint 10, the elbow joint 11, and the wrist joint 12 of each of the arms 4 comprise three electric motors, one electric motor, and three electric motors, respectively, so that the shoulder joint 10, the elbow joint 11, and the wrist joint 12 have three, one, and three degrees of freedom, respectively.

The robot R has an imaging camera 14 mounted on the head 1 and functioning as an eye, and a gyroscopic sensor 9c and an acceleration sensor 9d which are mounted in the torso 2 for detecting an attitude and a rate of change thereof of the torso 2. The imaging camera 14 can change its direction of view with an electric motor (not shown) mounted in the head 1. The electric motor combined with the imaging camera 14 and the other electric motors mounted in the legs 3 and the arms 4 are associated with respective rotary encoders (not shown in FIG. 1) for detecting angular displacements of the electric motors.

Figure 2:
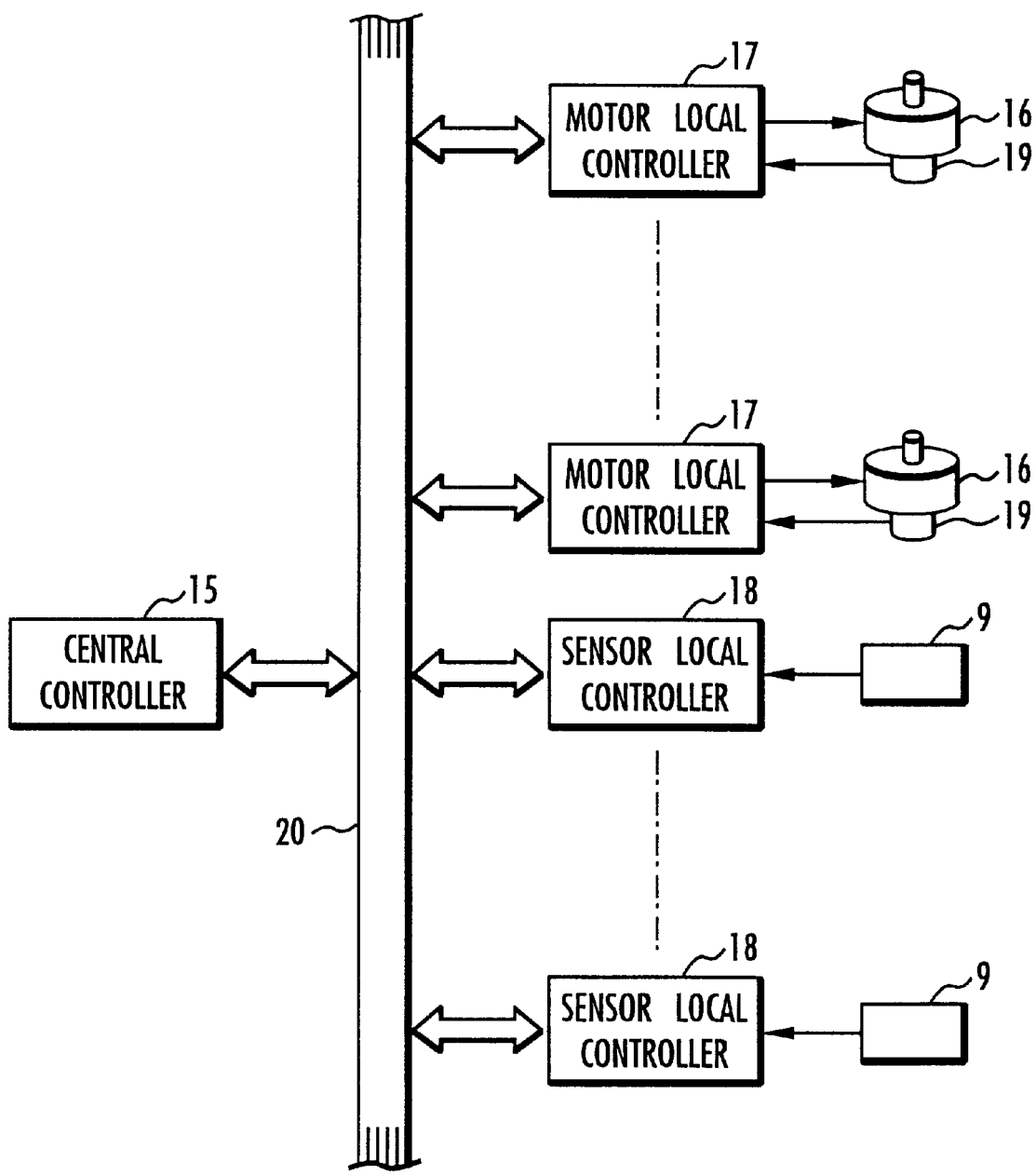
FIG. 2 is a block diagram of a control system incorporated in the robot shown in FIG. 1.

The robot R incorporates a control system shown in FIG. 2. The 6-axis force sensors 9a, 9b, the gyroscopic sensor 9c, and the acceleration sensor 9d will also collectively be referred to as "sensors 9".

As shown in FIG. 2, the control system comprises a central controller 15, a plurality of local controllers 17 (hereinafter referred to as "motor local controllers 17") associated with respective electric motors 16 that are mounted in the legs 3, the arms 4, and the head 1 as described above, and a plurality of local controllers 18 (hereinafter referred to as "sensor local controllers 18") associated with the respective sensors 9.

The central controller 15 is mounted in the torso 2 as shown in FIG. 1. Each of the motor local controllers 17 is positioned near the corresponding electric motor 16 and electrically connected to the electric motor 16 and a rotary encoder 19 attached to the electric motor 16. For example, the motor local controllers 17 which correspond to the electric motors 16 of each of the hip joints 5 are disposed at the hip joint 5 and electrically connected to the electric motors 16 and rotary encoders 19 attached thereto by leads. The other motor local controllers 17 which correspond to the other electric motors 16 are similarly disposed and electrically connected. Likewise, each of the sensor local controllers 17 is positioned near the corresponding sensor 9 and electrically connected to the sensor 9. The central controller 15, the motor local controllers 17, and the sensor local controllers 18 are connected to each other by a buss line 20 passing through locations where those controllers 15, 17, 18 are positioned, and send and receive various digital data via the bus line 20.

The central controller 15 generate, in given control cycles, command data for angular displacements of the electric motors 16 to cause the robot R to make a desired action, e.g., a walking or working action, based on instruction data for a motion pattern of the robot R which are given from a command unit (not shown) external to the robot R, data generated by a teaching process, detected data obtained by the sensors 9, image data captured by the imaging camera 14, and data of operating states, e.g., actual angular displacements, of the electric motors 16, and send the generated command data to the motor local controllers 17 via the bus line 20.

Figure 3:
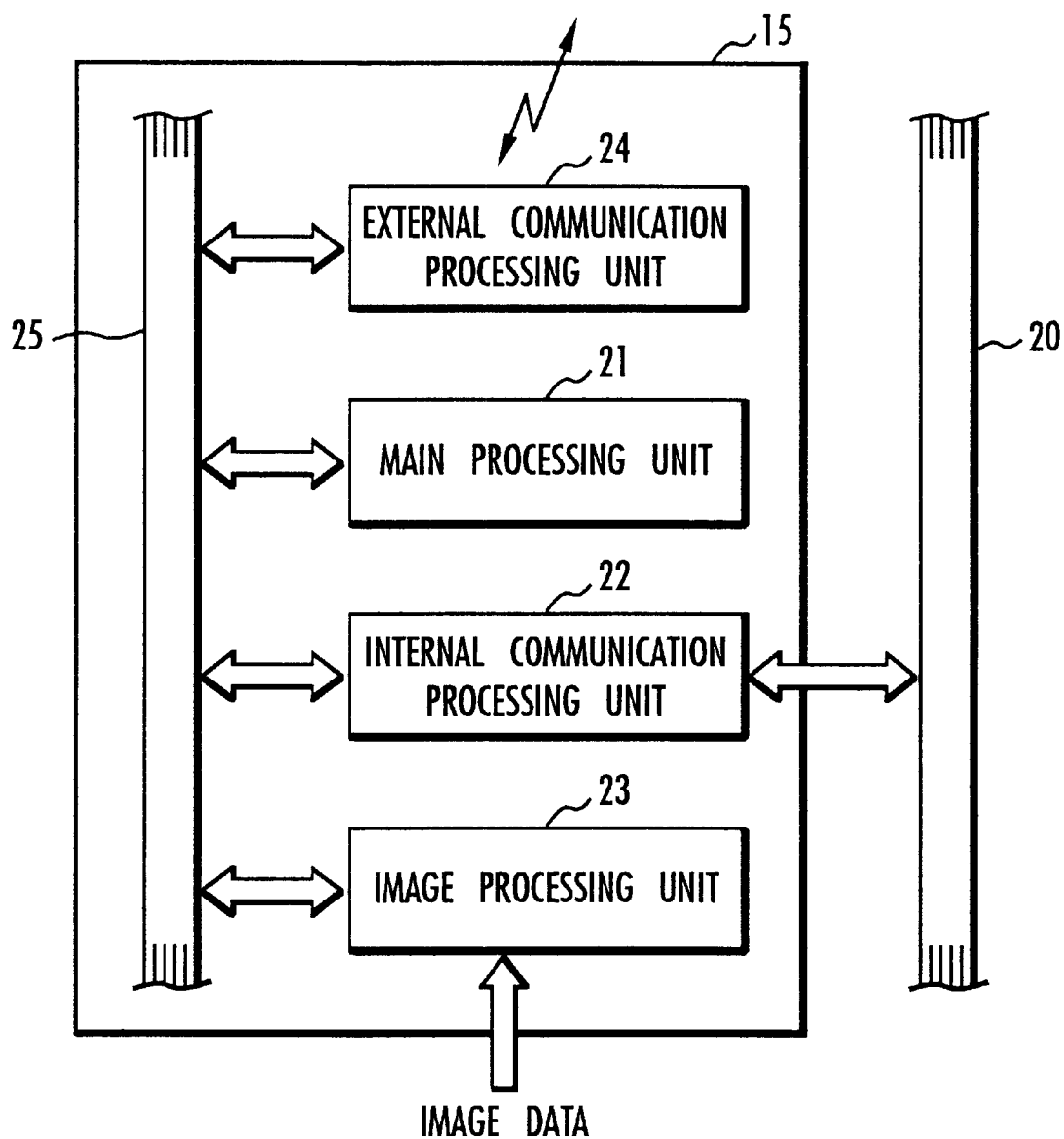
FIG. 3 is a block diagram of a central controller of the control system shown in FIG. 2.

As shown in FIG. 3, the central controller 15 comprises a main processing unit 21 for generating command data for angular displacements of the electric motors 16, an internal communication processing unit 22 for performing communications between the motor local controllers 17 and the sensor local controllers 18 via the bus line 20, an image processing unit 23 for analyzing image data captured by the imaging camera 14, and an external communication processing unit 24 for performing communications to and from the command unit external to the robot R. Each of these units 21, 22, 23, 24 comprises an electronic circuit including a CPU, a RAM, and a ROM. The units 21, 22, 23, 24 can send data to and receive data from each other via a bus line 25 in the central controller 15.

The external communication processing unit 24 performs communications to and from the command unit external to the robot R via a radio link.

Each of the motor local controllers 17 mainly functions to control actual operation of the corresponding electric motor 16 while exchanging command data for an angular displacement of the electric motor 16 and data of an actual motion, e.g., an actual angular displacement, of the electric motor 16, with the central controller 15.

Figure 4:
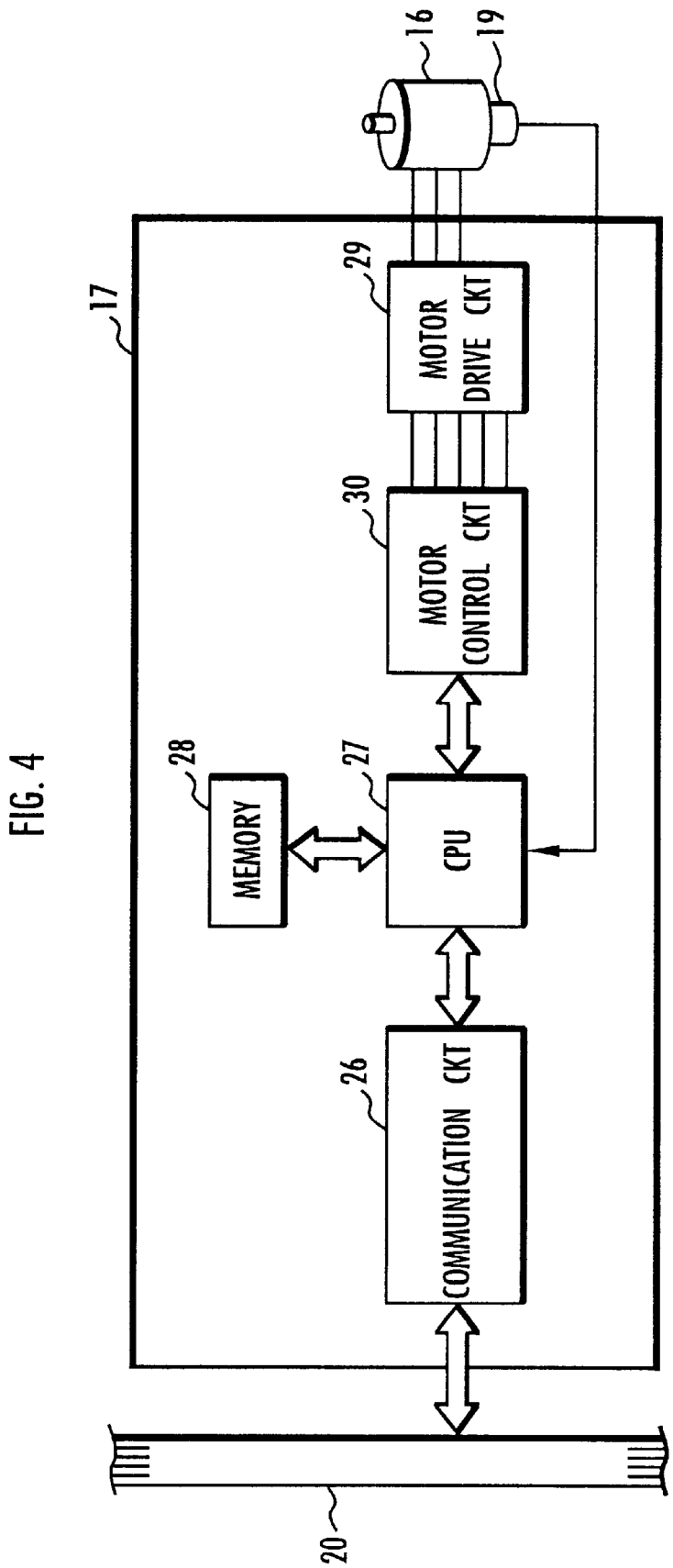
FIG. 4 is a block diagram of a local controller for a motor of the control system shown in FIG. 2.

As shown in FIG. 4, each of the motor local controllers 17 comprises a communication circuit 26 for sending data to and receiving data from the central controller 15 via the bus line 20, a CPU 27 for generating command data for a current to be supplied to the electric motor 16 based on command data for an angular displacement of the electric motor 16 which is supplied from the central controller 15, monitoring communications with the central controller 15, and generating data to be sent to the central controller 15, a memory 28 (memory means) comprising a PAM and a ROM for storing various data and programs, a motor drive circuit 29 electrically connected to the electric motor 16, and a motor control circuit 30 for controlling energization and de-energization of the electric motor 16 via the motor drive circuit 29. The CPU 27 is supplied with data representing an actual angular displacement of the electric motor 16 from the rotary encoder 19 that is attached to the electric motor 16. Although not shown, the motor local controller 17 has a means for detecting a current supplied to the electric motor 16 and sending detected data to the motor control circuit 30.

Figure 5:
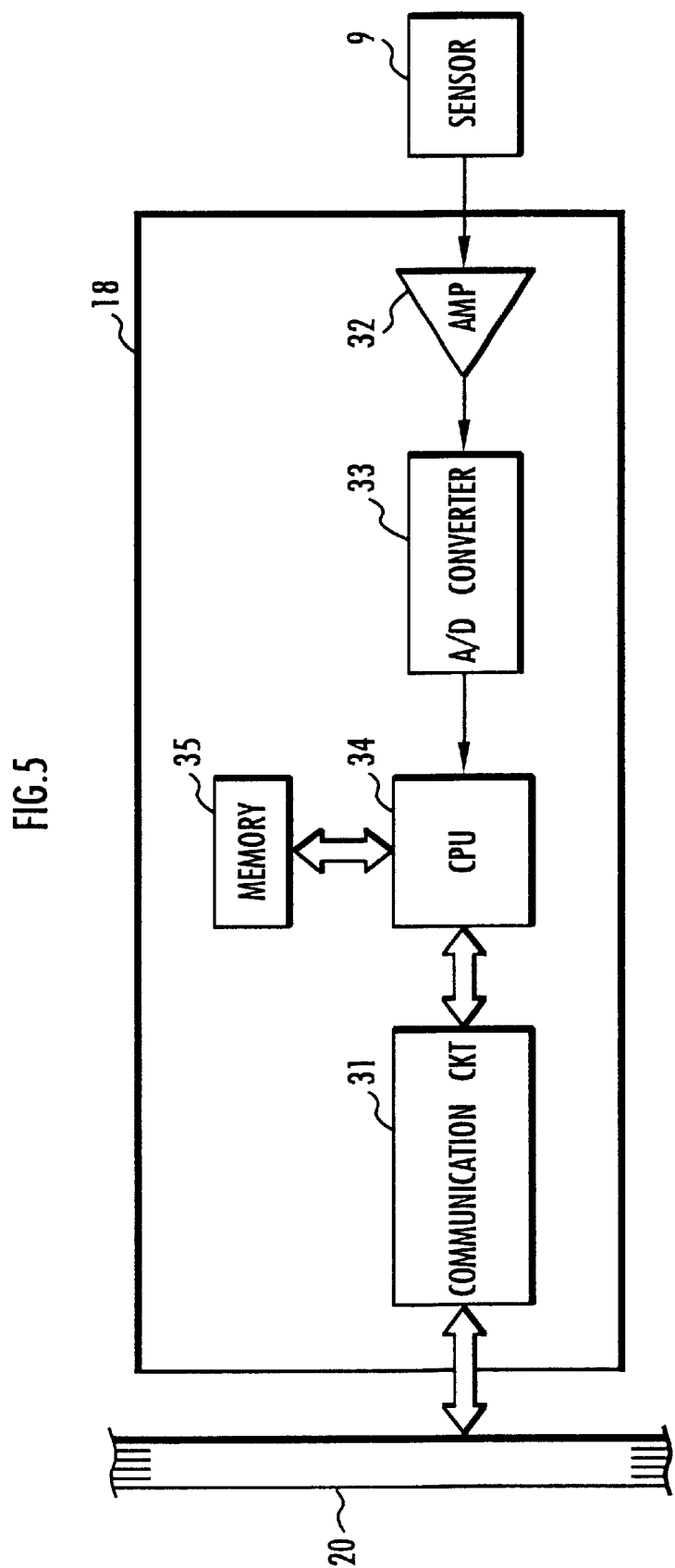
FIG. 5 is a block diagram of a local controller for a sensor of the control system shown in FIG. 2.

Each of the sensor local controllers 18 functions to read detected data from the corresponding sensor 9 and send the detected data to the central controller 15. As shown in FIG. 5, each of the sensor local controllers 18 comprises a communication circuit 31 for sending data to and receiving data from the central controller 15 via the bus line 20, an amplifier 32 for amplifying an output signal from the sensor 9, a CPU 34 for reading the amplified output signal from the amplifier 32 via an A/D converter 33 and monitoring communications with the central controller 15, and a memory 35 comprising a RAM and a ROM for storing various data and programs.

The robot R has a circuit power supply battery (not shown) mounted in the torso 2 for energizing the above circuits of the motor local controllers 17 and the sensor local controllers 18. The circuit power supply battery supplies electric energy via power supply lines to the motor local controllers 17 and the sensor local controllers 18.

The robot R also has a motor power supply battery (not shown) mounted in the torso 2 for energizing the electric motors 16. The motor power supply battery supplies electric energy via power supply lines to the motor drive circuits 29 of the motor local controllers 17.

Operation of the robot R will be described below.

First, a basic mode of operation will be described below. The main processing unit 21 of the central controller 15 generates, in given control cycles, command data for angular displacements (target angular displacements) of the electric motors 16 based on data generated by a teaching process, data of actual angular displacements of the electric motors which are given from the motor local controllers 17 and the sensor local controllers 18 as described later on, and detected data obtained by the sensors 9, etc.

The internal communication processing unit 22 then outputs, in each control cycle, the generated command data for angular displacements of the electric motors 16 and command data for the sensor local controllers 18, specifically command data for reading output signals from the sensors 9, to the bus line 20.

At this time, predetermined identifiers (ID codes) for the motor local controllers 17 corresponding to the respective electric motors 16 are assigned to the respective command data for angular displacements of the electric motors 16. Similarly, predetermined identifiers (ID codes) for the sensor local controllers 18 are assigned to the respective command data for the sensor local controllers 18.

The data thus outputted from the central controller 15 to the bus line 20 are received by the CPUs 27 of the motor local controllers 17 via the communication circuits 26 thereof and also received by the CPUs 34 of the sensor local controllers 18 via the communication circuits 31 thereof.

In each of the motor local controllers 17, when the CPU 27 receives the command data with the identifier corresponding to its own motor local controller 17, the CPU 27 stores the detected data from the rotary encoder 19 at the time, i.e., the data of the actual angular displacement of the electric motor 16, in the memory 28. The CPU 27 also stores the supplied command data for an angular displacement of the electric motor 16 in the memory 28. The memory 28 stores, in a time-series fashion, command data in a given number of control cycles in the past from the present time, i.e., a plurality of command data for a period corresponding to a predetermined number of control cycles.

Then, the CPU 27 generates command data for a current to be supplied to the electric motor 16 based on the supplied command data for an angular displacement of the electric motor 16, and supplies the generated command data to the motor control circuit 30. The motor control circuit 30, while monitoring detected data of a current supplied to the electric motor 16, controls the motor drive circuit 29 to supply a current to the electric motor 16 based on the command data given from the CPU 27.

The electric motors 16 are thus controlled based on the command data for angular displacements that are supplied from the central controller 15 to the motor local controllers 17 corresponding to the electric motors 16.

After having thus controlled the electric motor 16, the CPU 27 of each of the motor local controllers 17 outputs the data of the actual angular displacement of the electric motor 16, which is stored in the memory 28, via the communication circuit 26 to the bus line 20 for transmission to the central controller 15. To the data, there is assigned the identifier of the motor local controller 17 which outputs the data.

When each of the sensor local controllers 18 receives command data to which the identifier of the sensor local controller 18 is assigned, the sensor local controller reads the output signal (detected signal) from the sensor 9 at the time via the amplifier 32 and the A/D converter 33, stores the detected signal in the memory 35, and then outputs the detected signal via the communication circuit 31 to the bus line 20 for transmission to the central controller 15. To the data outputted to the bus line 20, i.e., the detected signal from the sensor 9, there is assigned the identifier of the sensor local controller 18.

The data thus outputted from the motor local controllers 17 and the sensor local controllers 18 to the bus line 20 are received, in the same order that they are outputted to the bus line 20, by the internal communication processing unit 22 of the central controller 15, and stored in a memory (not shown). In a next cycle, the main processing unit 21 uses the stored data in order to generate command data for angular displacements of the electric motors 16.

The basic mode of operation of the robot R has been described above.

The CPU 27 of each of the motor local controllers 17 monitors a reception status of command data for an angular displacement from the central controller 15. If the CPU 27, after having received command data in a preceding control cycle, fails to receive new command data addressed to its own motor local controller 17 upon elapse of the period of the preceding control cycle, or recognizes an error in received command data, e.g., a parity-bit data error, then the CPU 27 performs the following control process:

The CPU 27 reads the command data in the past, i.e., the command data prior to the preceding cycle, which have been stored in a time-series fashion in the memory 28, and predicts command data in the present control cycle from the read command data. Then, the CPU 27 controls the motor control circuit 30 and the motor drive circuit 29 to energize the electric motor 16 based on the predicted command data in the same manner as in the basic mode of operation.

The CPU 27 predicts command data in the present control cycle as follows: The CPU 27 determines a function, e.g., a quadratic function, representing a time-dependent change of the command data for the angular displacements of the electric motor 16 from the past command data according to a method of minimum squares, for example, and predicts command data in the present control cycle according to the function.

Since the CPU 27 controls the electric motor 16 using the command data thus predicted, the electric motor 16 and hence the robot R are prevented from abruptly changing their action even if the bus line 20 suffers a disconnection and the motor local controller 17 is unable to receive normal command data. Because the electric motors 16 mounted particularly in the legs 3 are prevented from abruptly changing their action, the robot R is prevented from falling and hence damaging the robot R itself or an object that would otherwise be hit by the robot R.

In the above embodiment, the distributed-processing control system has been constructed which includes the motor local controllers 17 associated with all the electric motors 16 of the robot R. However, only the electric motors 16 mounted in the legs 3 may be associated with respective motor local controllers 17, and the other electric motors 16 mounted in the arms 4 may directly be controlled by the central controller 15 or another separate controller.

Although a certain preferred embodiment of the present invention has been shown and described in detail, it should be understood that various changes and modifications may be made therein without departing from the scope of the appended claims.

What is claimed is:

1. An apparatus for controlling a legged mobile robot having a plurality of actuators including at least actuators for moving legs thereof, comprising:

a plurality of local controllers disposed near and connected to the actuators, respectively, for controlling operation of the actuators; and a central controller connected to said local controllers for sequentially generating command data for controlling the operation of the actuators controlled by said local controllers and sending the generated command data to said local controllers;

each of said local controllers comprising:

memory means for storing said command data sent from said central controller to said each local controller for a predetermined period; and means for monitoring a reception status of said command data in said each local controller and, in the event of a reception failure of the command data, controlling operation of the actuator corresponding to said each local controller based on said command data for said predetermined period in the past which have been stored in said memory means.

2. An apparatus according to claim 1, wherein each of said local controllers comprises:

means for, in the event of a reception failure of the command data, determining a function approximating a time-dependent change of said command data for said predetermined period in the past which have been stored in said memory means, generating new command data according to the determined function, and controlling operation of the actuator corresponding to said each local controller based on said new command data.

* * * * *